US012570836B2

(12) United States Patent
Sasaki et al.

(10) Patent No.: US 12,570,836 B2
(45) Date of Patent: Mar. 10, 2026

(54) SHEET CONTAINING BORON NITRIDE PARTICLES EACH HAVING HOLLOW PART

(71) Applicant: Denka Company Limited, Tokyo (JP)

(72) Inventors: Yusuke Sasaki, Tokyo (JP); Kenji Miyata, Tokyo (JP); Michiharu Nakashima, Tokyo (JP)

(73) Assignee: Denka Company Limited, Tokyo (JP)

( * ) Notice: Subject to any disclaimer, the term of this patent is extended or adjusted under 35 U.S.C. 154(b) by 239 days.

(21) Appl. No.: 18/041,851

(22) PCT Filed: Aug. 19, 2021

(86) PCT No.: PCT/JP2021/030446
§ 371 (c)(1),
(2) Date: Feb. 16, 2023

(87) PCT Pub. No.: WO2022/039235
PCT Pub. Date: Feb. 24, 2022

(65) Prior Publication Data
US 2024/0010817 A1    Jan. 11, 2024

(30) Foreign Application Priority Data
Aug. 20, 2020    (JP) ................................. 2020-139474

(51) Int. Cl.
*C08K 7/24*        (2006.01)
*C08J 5/18*        (2006.01)
*C08K 3/38*        (2006.01)

(52) U.S. Cl.
CPC .................. *C08K 7/24* (2013.01); *C08J 5/18* (2013.01); *C08J 2300/00* (2013.01); *C08K 2003/385* (2013.01); *C08K 2201/004* (2013.01); *C08K 2201/016* (2013.01)

(58) Field of Classification Search
None
See application file for complete search history.

(56) References Cited

U.S. PATENT DOCUMENTS

2015/0152251 A1    6/2015    Koshida et al.
2017/0055339 A1*   2/2017    Zhang ................. H05K 1/0373
2020/0247672 A1    8/2020    Takeda et al.

FOREIGN PATENT DOCUMENTS

CN        104470873 A       3/2015
CN        108545708 A       9/2018
JP        2011-098882 A     5/2011
JP        2016-076586 A     5/2016
JP        2017-520633 A     7/2017
KR        20200068673 A     6/2020
WO    WO 2014/003193 A1     1/2014
(Continued)

OTHER PUBLICATIONS

Japan Patent Office, International Search Report issued in International Application No. PCT/JP2021/030446 (Oct. 19, 2021).
(Continued)

*Primary Examiner* — Chinessa T. Golden
(74) *Attorney, Agent, or Firm* — Leydig, Voit & Mayer, Ltd.

(57)    ABSTRACT
A sheet containing a resin and boron nitride particles each having a hollow part, in which the resin is filled into the hollow part of the boron nitride particles.

4 Claims, 4 Drawing Sheets

(56)     References Cited

FOREIGN PATENT DOCUMENTS

| WO | WO 2015/167950 A1 | 11/2015 |
| WO | WO 2019/073690 A1 | 4/2019 |
| WO | WO 2020/031883 A1 | 2/2020 |

OTHER PUBLICATIONS

The International Bureau of WIPO, International Preliminary Report on Patentability issued in International Application No. PCT/JP2021/030446 (Mar. 2, 2023).
State Intellectual Property Office, Office Action issued in Chinese Patent Application No. 202180038782.6 (Oct. 26, 2023).

* cited by examiner

SHEET CONTAINING BORON NITRIDE PARTICLES EACH HAVING HOLLOW PART

CROSS-REFERENCE TO RELATED APPLICATIONS

This patent application is the U.S. national phase of International Application No. PCT/JP2021/030446, filed on Aug. 19, 2021, which claims the benefit of Japanese Patent Application No. 2020-139474, filed Aug. 20, 2020, the disclosures of which are incorporated herein by reference in their entireties for all purposes.

TECHNICAL FIELD

The present disclosure relates to a sheet containing boron nitride particles each having a hollow part.

BACKGROUND ART

In electronic components such as power devices, transistors, thyristors and CPUs, there has been a problem of efficient dissipation of heat that is generated during use. For this problem, heat dissipation members containing a ceramic powder having high thermal conductivity are in use.

As the ceramic powder, a boron nitride powder having characteristics such as high thermal conductivity, high insulating properties and low relative permittivity are attracting attention. Ordinarily, the boron nitride powder is composed of an agglomerated particle (massive particle) that is formed by the agglomeration of the primary particles of boron nitride. For example, Patent Literature 1 discloses a hexagonal boron nitride powder in which the shape of an agglomerated particle is made to be single-layer spherical to enhance the loading properties and also improve the powder strength, and, furthermore, the purity is increased to achieve the improvement of the insulating properties and the stabilization of the withstanding voltage of heat transfer sheets and the like into which the powder is loaded.

CITATION LIST

Patent Literature

[Patent Literature 1] Japanese Unexamined Patent Publication No. 2011-98882

SUMMARY OF INVENTION

Technical Problem

According to the present inventors' studies, as the amount of the boron nitride powder loaded into a heat transfer sheet as described above increases, the heat transfer sheet becomes heavier, and there are cases where weight reduction is desirable.

Therefore, an objective of the present invention is to provide a sheet enabling weight reduction.

Solution to Problem

One aspect of the present invention is a sheet containing a resin and boron nitride particles each having a hollow part, in which the resin is filled into the hollow part of the boron nitride particle.

In this sheet, the boron nitride particle has a hollow part, and the resin that weighs less than boron nitride is filled into </div>

<div style="column: 2"> this hollow part, which makes it possible to reduce the weight of the sheet compared with a case where, for example, an agglomerated particle (massive particle) formed by the agglomeration of the primary particles of conventional boron nitride is used. In addition, surprisingly, it was clarified that the sheet containing the boron nitride particle having a hollow part can have the same or high thermal conductivity compared with, for example, sheets containing an agglomerated particle (massive particle) of conventional boron nitride.

In a cross section of the sheet, an area proportion of the hollow part in a boron nitride particle may be 40% or more.

The boron nitride particles may contain a boron nitride particle having an aspect ratio of 1.5 or more. This boron nitride particle having an aspect ratio of 1.5 or more may have a maximum length of 80 μm or longer.

Advantageous Effects of Invention

According to the present invention, it is possible to provide a sheet capable of weight reduction.

DESCRIPTION OF EMBODIMENTS

Figure 1:
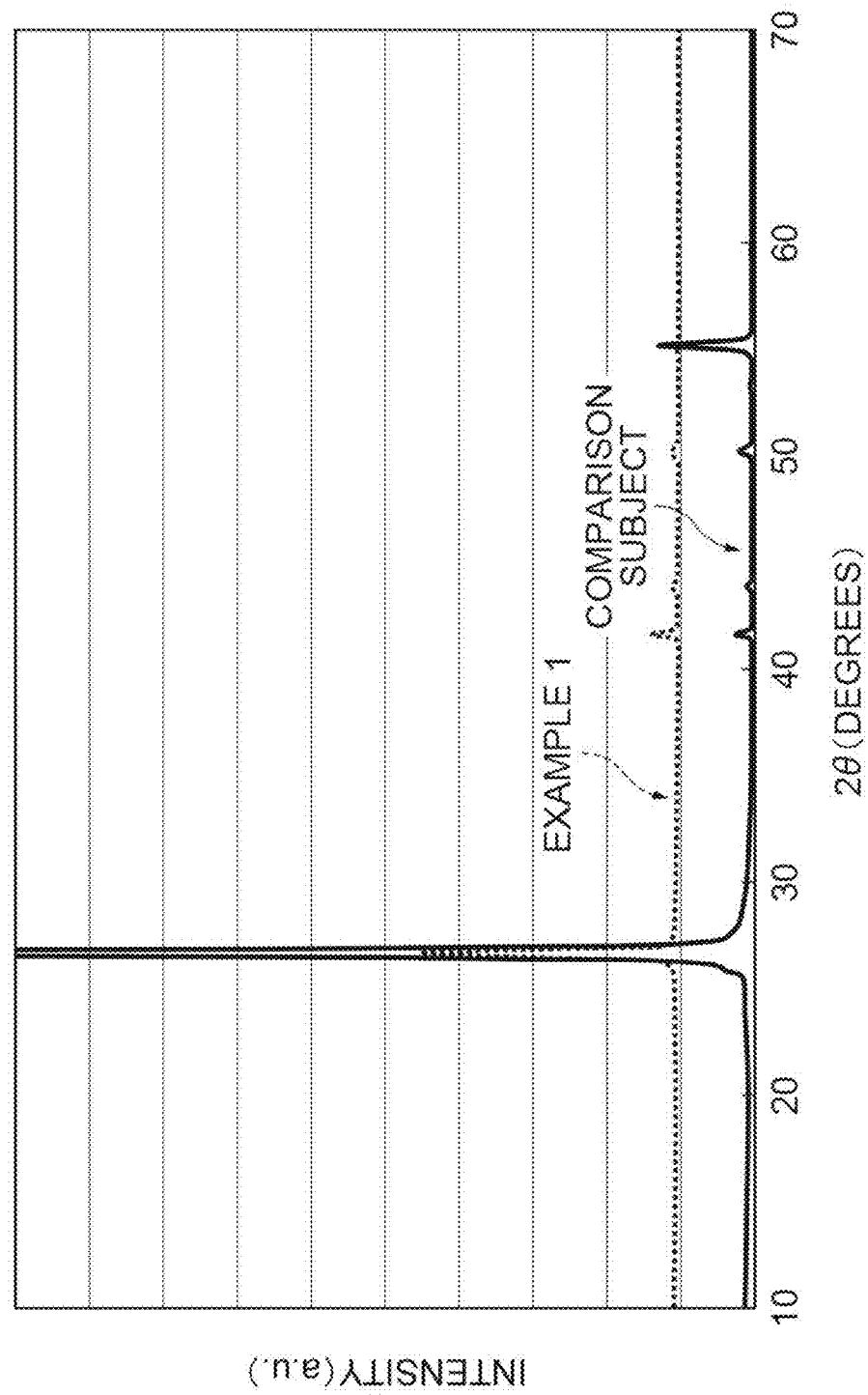
FIG. 1 is a graph of X-ray diffraction measurement results of boron nitride particles of Example 1.

Hereinafter, an embodiment of the present invention will be described in detail. One embodiment of the present invention is a sheet containing a resin and boron nitride particles. This sheet can be used as, for example, a heat dissipation sheet.

Examples of the resin include an epoxy resin, a silicone resin, silicone rubber, an acrylic resin, a phenolic resin, a melamine resin, a urea resin, an unsaturated polyester, a fluorine resin, a polyimide, a polyamide-imide, polyether-imide, polybutylene terephthalate, polyethylene terephthalate, polyphenylene ether, polyphenylene sulfide, wholly aromatic polyester, polysulfone, a liquid crystal polymer, polyethersulfone, polycarbonate, a maleimide-modified resin, an ABS (acrylonitrile-butadiene-styrene) resin, an AAS (acrylonitrile-acrylic rubber styrene) resin, an AES (acrylonitrile ethylene propylene diene rubber styrene) resin and the like. These resins may be used singly or two or more resins may be used in combination. The resin may be in an uncured state, may be in a semi-cured state (a state where the cured resin and the uncured resin are present) or may be completely cured (a state where only the substantially cured resin is present).

The proportion of the resin in the sheet may be 10% or more, 20% or more, 30% or more or 40% or more and may be 90% or less, 85% or less or 80% or less.

The proportion of the resin in the sheet is defined as the average value of calculated area proportions in 10 cross sections, where cross-sectional images (SEM images) obtained by observing 10 arbitrary cross sections of the sheet with a scanning electron microscope (SEM) at a magnification of 300 times are imported into image analyzing software (for example, "Mac-view" manufactured by </div>

Mountech Co., Ltd.), and the area proportion of the resin (including the resin filled into the hollow part of the boron nitride particles) in an arbitrary 300 μm×300 μm region in each cross-sectional image is calculated.

The boron nitride particles are boron nitride particles each having a hollow part. The boron nitride particles may each have, for example, a shell part formed of boron nitride and a hollow part surrounded by the shell part. In other words, the boron nitride particles each have a hollow shape. The shell part may have an opening that communicates with the hollow part. The hollow part may be formed along the external appearance shape of a boron nitride particle or may have a shape that is an approximately similar shape to the external appearance shape of a boron nitride particle.

The fact that the boron nitride particles each have a hollow shape as described above can be confirmed from a SEM image of a cross section of the sheet obtained by observing the cross section of the sheet with SEM. In a case where the shell part of a boron nitride particle does not have an opening (forms a closed space) in the cross-sectional image (SEM image) of the sheet, the hollow part of the boron nitride particle means the closed space. In addition, in a case where the shell part of a boron nitride particle has an opening in the cross-sectional image (SEM image) of the sheet, the hollow part of the boron nitride particle means a portion that is surrounded by a straight line that connects the ends of the boron nitride particle in the opening and the shell part of the boron nitride particle. The straight line that connects the ends of the boron nitride particle in the opening connects the ends in a manner that the area of the hollow part is maximized.

The boron nitride particles each have a hollow part, whereby it is possible to fill the resin that weighs less than boron nitride into the hollow part, which makes it possible to expect the weight reduction of the sheet compared with solid boron nitride particles (for example, conventional boron nitride particles formed by the agglomeration of the primary particles of boron nitride).

From the viewpoint of additional weight reduction of the sheet, the boron nitride particles may contain a boron nitride particle in which the area proportion of the hollow part in the boron nitride particle is 40% or more, 50% or more or 60% or more in the cross section of the sheet. The area proportion of the hollow part in the boron nitride particle may be 90% or less or 80% or less.

The area proportion of the hollow part of the boron nitride particle can be obtained by importing a cross-sectional image (SEM image) of the sheet into image analyzing software (for example, "Mac-view" manufactured by Mountech Co., Ltd.) and calculating the area proportion from the cross-sectional image of the boron nitride particle in the cross-sectional image.

From the viewpoint of additional weight reduction of the sheet, the boron nitride particles may contain a boron nitride particle in which the thickness of the shell part is preferably 50 μm or less, more preferably 30 μm or less and still more preferably 15 μm or less. The thickness of the shell part of the boron nitride particle may be 1 μm or more or 3 μm or more from the viewpoint of making it easy to maintain the shape of the boron nitride particle. The thickness of the shell part is defined as the average value of the thicknesses of the shell part at 10 arbitrary sites in one boron nitride particle having the hollow part in the cross-sectional image (SEM image) of the sheet.

The boron nitride particles may contain a boron nitride particle having an aspect ratio of 1.5 or more, 1.7 or more, 2.0 or more, 3.0 or more, 5.0 or more or 7.0 or more. The aspect ratio of the boron nitride particle may be 12.0 or less, 10.0 or less, 9.0 or less or 8.0 or less.

The aspect ratio of the boron nitride particle is defined as the ratio $(L_1/L_2)$ of the maximum length (the maximum length in the longitudinal direction) $L_1$ of the boron nitride particle to the maximum length of the boron nitride particle in the lateral direction perpendicular to a direction where the maximum length is present (longitudinal direction) (the maximum length in the lateral direction) $L_2$ of the boron nitride particle. The maximum length of the boron nitride particle means the length of the maximum one of direct distances between two arbitrary points on one boron nitride particle when a cross section of the sheet is observed with SEM. The maximum length $L_1$ in the longitudinal direction and the maximum length $L_2$ in the lateral direction of the boron nitride particle can be measured by importing the SEM image of the sheet into image analyzing software (for example, "Mac-view" manufactured by Mountech Co., Ltd.).

The sheet may have a cross section where the average aspect ratio of the boron nitride particles become 1.3 or more, and the average aspect ratio may be 1.5 or more or 1.7 or more and may be 10.0 or less, 9.0 or less or 8.0 or less.

The average aspect ratio of the boron nitride particles is defined as described below. That is, first, three visual fields on a cross section of the sheet are observed with a scanning electron microscope (SEM) at a magnification of 300 times, and the cross-sectional image (SEM image) of each visual field is imported into image analyzing software (for example, "Mac-view" manufactured by Mountech Co., Ltd.), and, in an arbitrary 300 μm×300 μm region in the cross-sectional image of each visual field, a total of five boron nitride particles are observed at three visual fields. At this time, the average aspect ratio of the boron nitride particles is defined as the average value of the aspect ratios of the five boron nitride particles observed in the three visual fields.

As the aspect ratio or average aspect ratio of the boron nitride particles increases, the shape of the boron nitride becomes longer and thinner, and thus it is possible to improve the thermal conductivity of the boron nitride particle in the longitudinal direction. Particularly, when the boron nitride particle is disposed such that the longitudinal direction of the boron nitride particle is along the thickness direction of the sheet, thermal loss between the boron nitride particles becomes small, and thus the thermal conductivity of the sheet is considered to be superior.

The maximum length $L_1$ in the longitudinal direction of the boron nitride particle having the above-described aspect ratio may be 80 μm or longer, 100 μm or longer or 150 μm or longer from the viewpoint of further improving the thermal conductivity of the sheet. The maximum length $L_1$ in the longitudinal direction of the boron nitride particle may be 500 μm or shorter or 400 μm or shorter.

The sheet may have a cross section where the average maximum length of the boron nitride particles is 50 μm or longer. The average maximum length may be 70 μm or longer or 80 μm or longer and may be 500 μm or shorter or 400 μm or shorter.

The average maximum length of the boron nitride particles is defined as described below. That is, first, three visual fields on a cross section of the sheet are observed with a scanning electron microscope (SEM) at a magnification of 300 times, and the cross-sectional image (SEM image) of each visual field is imported into image analyzing software (for example, "Mac-view" manufactured by Mountech Co., Ltd.), and, in an arbitrary 300 μm×300 μm region in the cross-sectional image of each visual field, a total of five boron nitride particles are observed at three visual fields. At this time, the average maximum length of the boron nitride particles is defined as the average value of the maximum lengths of the five boron nitride particles observed in the three visual fields.

It is considered that, when the maximum length or the average maximum length of the boron nitride particles is long, the number of the particles that are lined up in the thickness direction of the sheet becomes small, and heat transfer loss between the boron nitride particles becomes small, and thus the thermal conductivity of the sheet is superior.

In the boron nitride particle having the above-described aspect ratio, at least one of both ends in the longitudinal direction may be an open end or both may be open ends. The open end may communicate with the hollow part. In a case where the boron nitride particle has such an open end, it becomes easy for the resin to be filled into the hollow part of the boron nitride particle during the production of the sheet.

The proportion of the boron nitride particles in the sheet may be 10% or more, 15% or more or 20% or more from the viewpoint of improving the thermal conductivity of the sheet. The proportion of the boron nitride particles in the sheet may be 90% or less, 80% or less, 70% or less or 60% or less. The proportion of the boron nitride particles in the sheet is defined as the average value of calculated area proportions in 10 cross sections, where cross-sectional images obtained by observing 10 arbitrary cross sections of the sheet with SEM at a magnification of 300 times are imported into image analyzing software (for example, "Mac-view" manufactured by Mountech Co., Ltd.), and the area proportion of the boron nitride particles (excluding the hollow parts of the boron nitride particles) in an arbitrary 300 μm×300 μm region in each cross-sectional image is calculated.

The sheet may further contain other components. In a case where the resin is in an uncured state or in a partially cured state, the sheet may further contain a curing agent or may further contain a curing accelerator (curing catalyst). The curing agent is appropriately selected depending on the kind of the resin. In a case where the resin is an epoxy resin, examples of the curing agent include phenol novolac compounds, acid anhydrides, amino compounds, imidazole compounds and the like. The content of the curing agent may be 0.5 parts by mass or more or 1 part by mass or more and may be 15 parts by mass or less or 10 parts by mass or less with respect to 100 parts by mass of the resin.

The resin composition may further contain other components. The other components may be a curing accelerator (curing catalyst), a coupling agent, a wetting and dispersing additive, a surface conditioner and the like.

The other components may also be a coupling agent, a wetting and dispersing additive, a surface conditioner and the like. Examples of the coupling agent include a silane-base coupling agent, a titanate-based coupling agent, an aluminate-based coupling agent and the like. Examples of a chemical bonding group that is contained in these coupling agents include a vinyl group, an epoxy group, an amino group, a methacrylic group, a mercapto group and the like.

Examples of the wetting and dispersing additive include phosphate ester salt, carboxylate ester, polyester, acrylic copolymers, block copolymers and the like.

Examples of the surface conditioner include an acrylic surface conditioner, a silicone-based surface conditioner, a vinyl-based surface conditioner, a fluorine-based surface conditioner and the like.

The thickness of the sheet may be 50 μm or more, 80 μm or more or 100 μm or more and may be 500 μm or less, 400 μm or less or 300 μm or less.

The above-described sheet is produced by, for example, a method for producing a sheet including a step of preparing the above-described boron nitride particles (preparation step), a step of preparing a resin composition containing the boron nitride particles and a resin (preparation step) and a step of molding the resin composition into a sheet shape (molding step). That is, another embodiment of the present invention is such a method for producing a sheet.

The preparation step has, for example, a step of disposing a mixture and a base material in a container formed of a carbon material, in which the mixture includes boron carbide and boric acid, and the base material is formed of a carbon material (disposition step) and a step of generating boron nitride particles on the base material by performing heating and pressurization with a nitrogen atmosphere formed in the container (generation step). This makes it possible to produce boron nitride particles each having a hollow part.

The container formed of a carbon material is a container capable of accommodating the mixture and the base material. The container may be, for example, a carbon crucible. The container is preferably a container airtightness of which can be enhanced by covering an open part with a lid. In the disposition step, for example, the mixture may be disposed on a bottom part of the container, and the base material may be disposed so as to be fixed to a side wall surface in the container or to the inside of the lid. The base material formed of a carbon material may have, for example, a sheet shape, a plate shape or a rod shape. The base material formed of a carbon material may be, for example, a carbon sheet (graphite sheet), a carbon plate or a carbon rod.

The boron carbide in the mixture may be, for example, in a powder form (boron carbide powder). The boric acid in the mixture may be, for example, in a powder form (boric acid powder). The mixture can be obtained by, for example, mixing a boron carbide powder and a boric acid powder by a well-known method.

The boron carbide powder can be produced by a well-known production method. Examples of the method for producing the boron carbide powder include a method in which boric acid and acetylene black are mixed together and then heated at 1800° C. to 2400° C. for one to 10 hours in an inert gas (for example, nitrogen gas) atmosphere, thereby obtaining a massive boron carbide particle. The boron carbide powder can be obtained by appropriately performing pulverization, sieving, washing, impurity removal, drying and the like on the massive boron carbide particle obtained by this method.

The average particle diameter of the boron carbide powder can be adjusted by adjusting the pulverization time of the massive boron carbide particle. The average particle diameter of the boron carbide powder may be 5 μm or more, 7 μm or more or 10 μm or more and may be 100 μm or less, 90 μm or less, 80 μm or less or 70 μm or less. The average particle diameter of the boron carbide powder can be measured by a laser diffraction and scattering method.

The mixing ratio between the boron carbide and the boric acid can be appropriately selected. From the viewpoint of the boron nitride particles being likely to become large, the content of the boric acid in the mixture is, with respect to 100 parts by mass of the boron carbide, preferably 2 parts by mass or more, more preferably 5 parts by mass or more and still more preferably 8 parts by mass or more and may be 100 parts by mass or less, 90 parts by mass or less or 80 parts by mass or less.

The mixture containing boron carbide and boric acid may further contain other components. Examples of the other components include silicon carbide, carbon, iron oxide and the like. When the mixture containing boron carbide and boric acid further contains silicon carbide, it becomes easy to obtain boron nitride particles having no open end.

In the container, for example, a nitrogen atmosphere containing 95 vol % or more of nitrogen gas has been formed. The content of the nitrogen gas in the nitrogen atmosphere is preferably 95 vol % or more and more preferably 99.9 vol % or more and may be substantially 100 vol %. In the nitrogen atmosphere, not only the nitrogen gas but also ammonia gas or the like may be contained.

From the viewpoint of the boron nitride particles being likely to become large, the heating temperature is preferably 1450° C. or higher, more preferably 1600° C. or higher and still more preferably 1800° C. or higher. The heating temperature may be 2400° C. or lower, 2300° C. or lower or 2200° C. or lower.

From the viewpoint of the boron nitride particles being likely to become large, the pressure at the time of the pressurization is preferably 0.3 MPa or higher and more preferably 0.6 MPa or higher. The pressure at the time of the pressurization may be 1.0 MPa or lower or 0.9 MPa or lower.

From the viewpoint of the boron nitride particles being likely to become large, the time for performing the heating and the pressurization is preferably three hours or longer and more preferably five hours or longer. The time for performing the heating and the pressurization may be 40 hours or shorter or 30 hours or shorter.

In the generation step, boron nitride particles each having a hollow part are generated on the base material formed of a carbon material. Therefore, boron nitride particles can be obtained by collecting the boron nitride particles on the base material. The fact that the particles generated on the base material are boron nitride particles can be confirmed from the fact that a peak derived from boron nitride is detected when some of the particles generated on the base material are collected from the base material and X-ray diffraction measurement is performed on the collected particles.

A step of classifying the boron nitride particles obtained as described above so that only boron nitride particles each having a maximum length in a specific range can be obtained (classification step) may also be performed.

In the preparation step, a resin composition is prepared by, for example, mixing the boron nitride particles and a resin by a well-known method (for example, mixing with a Henschel mixer). The resin composition that is prepared in the preparation step may further contain a solvent (for example, a solvent that dissolves the resin) as necessary and may further contain the above-described other components.

In the preparation step, the amount of the boron nitride particles added may be 10 parts by mass or more, 30 parts by mass or more or 50 parts by mass or more and may be 600 parts by mass or less, 400 parts by mass or less or 300 parts by mass or less with respect to 100 parts by mass of the resin.

Examples of the solvent include alcohol-based solvents, glycol ether-based solvents, aromatic solvents, ketone-based solvents and the like. Examples of the alcohol-based solvents include isopropyl alcohol, diacetone alcohol and the like. Examples of the glycol ether-based solvents include ethyl cellosolve, butyl cellosolve and the like. Examples of the aromatic solvents include toluene, xylene and the like. Examples of the ketone-based solvents include methyl ethyl ketone, methyl isobutyl ketone and the like.

In the molding step, the resin composition is molded into a sheet shape by, for example, applying the resin composition onto the base material using a film applicator. In the molding step, a step of curing a part or all of the resin in the resin composition (curing step) may also be performed at the same time as the molding or after the molding.

A method for curing the resin is appropriately selected depending on the kind of the resin (and the curing agent that is used as necessary). For example, in a case where the resin is an epoxy resin and the above-described curing agent is used together, in the curing step, the resin can be cured by heating, and pressurization may be performed together with the heating. In this case, the curing state of the resin in a sheet to be obtained can be adjusted by adjusting the heating temperature and the heating time (the pressure and the pressurization time in a case where the pressurization is performed). In a case where the resin composition contains a solvent, the solvent may be volatilized along with the curing of the resin in the curing step.

EXAMPLES

Hereinafter, the present invention will be more specifically described using examples. However, the present invention is not limited to the following examples.

Example 1

Massive boron carbide particles were pulverized with a pulverizer, and a boron carbide powder having an average particle diameter of 10 μm was obtained. 100 Parts by mass of the obtained boron carbide powder and 9 parts by mass of boric acid were mixed together and loaded into a carbon crucible, an open part of the carbon crucible was covered with a carbon sheet (manufactured by NeoGraf Solutions), and the carbon sheet was sandwiched by a lid of the carbon crucible and the carbon crucible to fix the carbon sheet. The carbon crucible covered with the lid was heated in a nitrogen gas atmosphere under conditions of 2000° C. and 0.85 MPa for 20 hours in a resistance heating furnace, whereby particles were generated on the carbon sheet. The particles generated on the carbon sheet were collected and measured by X-ray diffraction using an X-ray diffractometer ("UL-TIMA-IV" manufactured by Rigaku Corporation). This X-ray diffraction measurement result and the X-ray diffraction measurement result of a boron nitride powder (GP grade) manufactured by Denka Company Limited as a comparison subject are each shown in FIG. 1. As is clear from FIG. 1, only a peak derived from boron nitride was detected, and it was possible to confirm that boron nitride particles were generated.

100 Parts by mass of a naphthalene-type epoxy resin (HP4032 manufactured by DIC Corporation) and 10 parts by mass of an imidazole compound (2E4MZ-CN manufactured by Shikoku Chemicals Corporation) as a curing agent were mixed together, and then 81 parts by mass of the obtained boron nitride particles were further mixed therewith, thereby obtaining a resin composition. This resin composition was vacuum-defoamed at 500 Pa for 10 minutes and applied onto a PET substrate such that the thickness became 1.0 mm. After that, heating and pressurization were performed for 60 minutes under conditions of a temperature of 150° C. and a pressure of 160 kg/cm², thereby obtaining a 0.5 mm-thick sheet.

Figure 2:
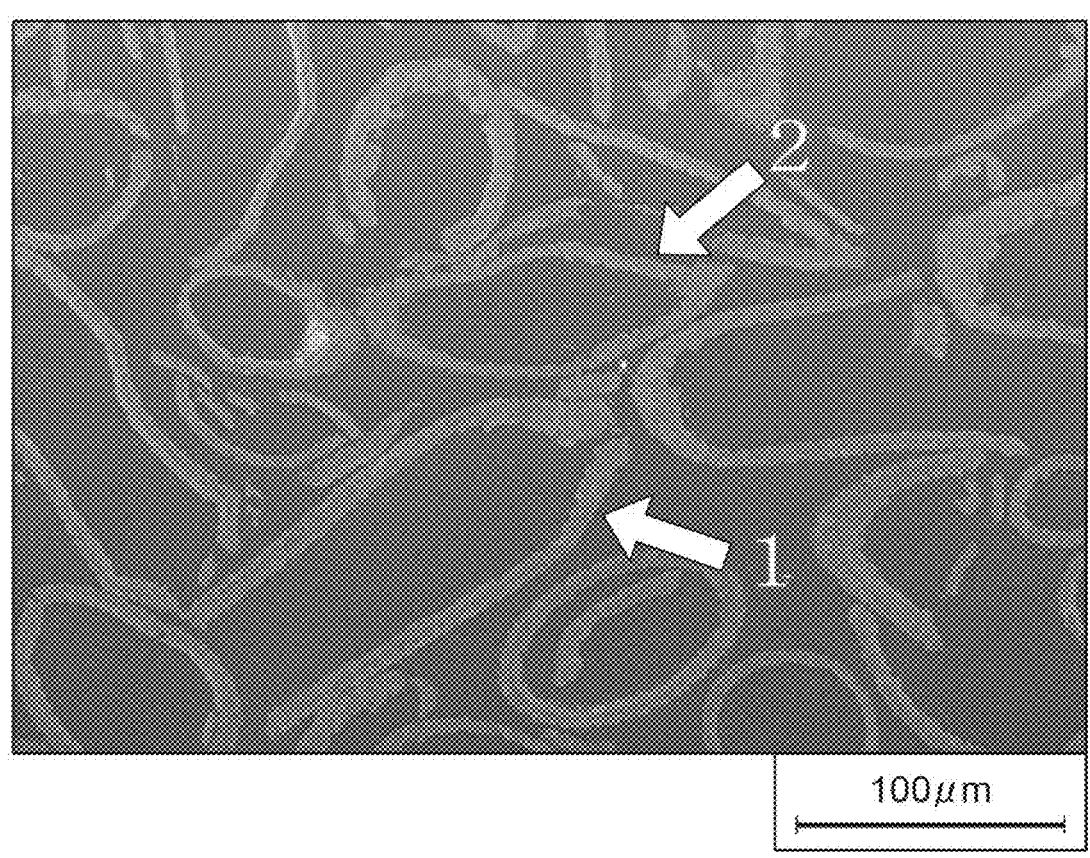
FIG. 2 is a SEM image of a cross section of a sheet of Example 1.

A SEM image of a cross section of the produced sheet is shown in FIG. 2. In the cross section of the sheet, in one of the boron nitride particles (a boron nitride particle indicated by an arrow 1 in FIG. 2), the area proportion of a hollow part in the boron nitride particle was 68%, the thickness of a shell part was 7.0 μm, the aspect ratio was 2.5, and the maximum length was 168 μm. In addition, in the cross section of the sheet, in another of the boron nitride particles (a boron nitride particle indicated by an arrow 2 in FIG. 2), the area proportion of a hollow part in the boron nitride particle was 62%, the thickness of a shell part was 6.2 μm, the aspect ratio was 2.9, and the maximum length was 140 μm. The proportion of the resin in the sheet was 64%, and the proportion of the boron nitride particles was 36%.

Example 2

Figure 3:
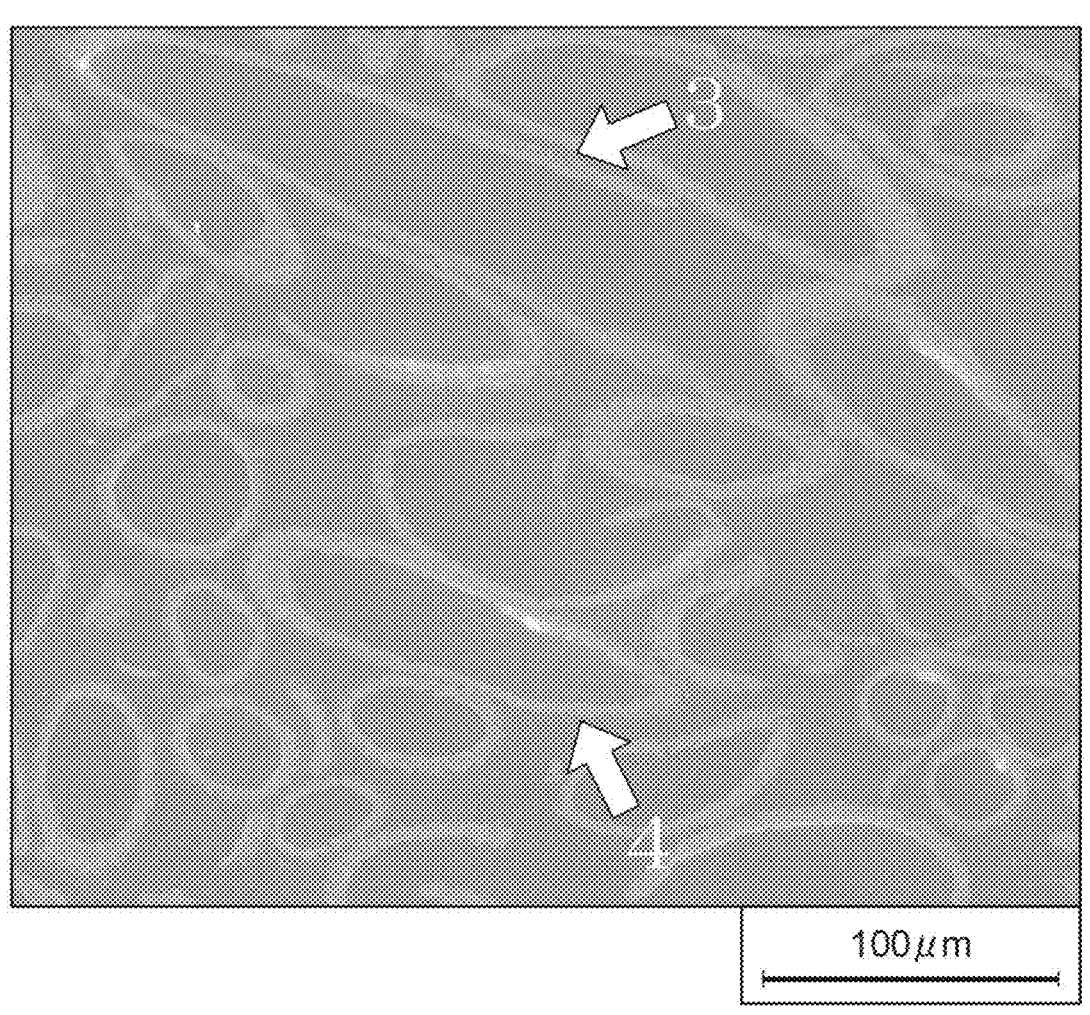
FIG. 3 is a SEM image of a cross section of a sheet of Example 2.

A sheet was produced in the same manner as in Example 1 except that the amount of the boron nitride particles added was changed to 47 parts by mass with respect to 100 parts by mass of the resin. A SEM image of a cross section of the produced sheet is shown in FIG. 3. In the cross section of the sheet, in one of the boron nitride particles (a boron nitride particle indicated by an arrow 3 in FIG. 3), the area proportion of a hollow part in the boron nitride particle was 75%, the thickness of a shell part was 5.5 μm, the aspect ratio was 3.9, and the maximum length was 211 μm. In addition, in the cross section of the sheet, in another of the boron nitride particles (a boron nitride particle indicated by an arrow 4 in FIG. 3), the area proportion of a hollow part in the boron nitride particle was 56%, the thickness of a shell part was 8.5 μm, the aspect ratio was 3.8, and the maximum length was 156 μm. The proportion of the resin in the sheet was 75%, and the proportion of the boron nitride particles was 25%.

Example 3

Figure 4:
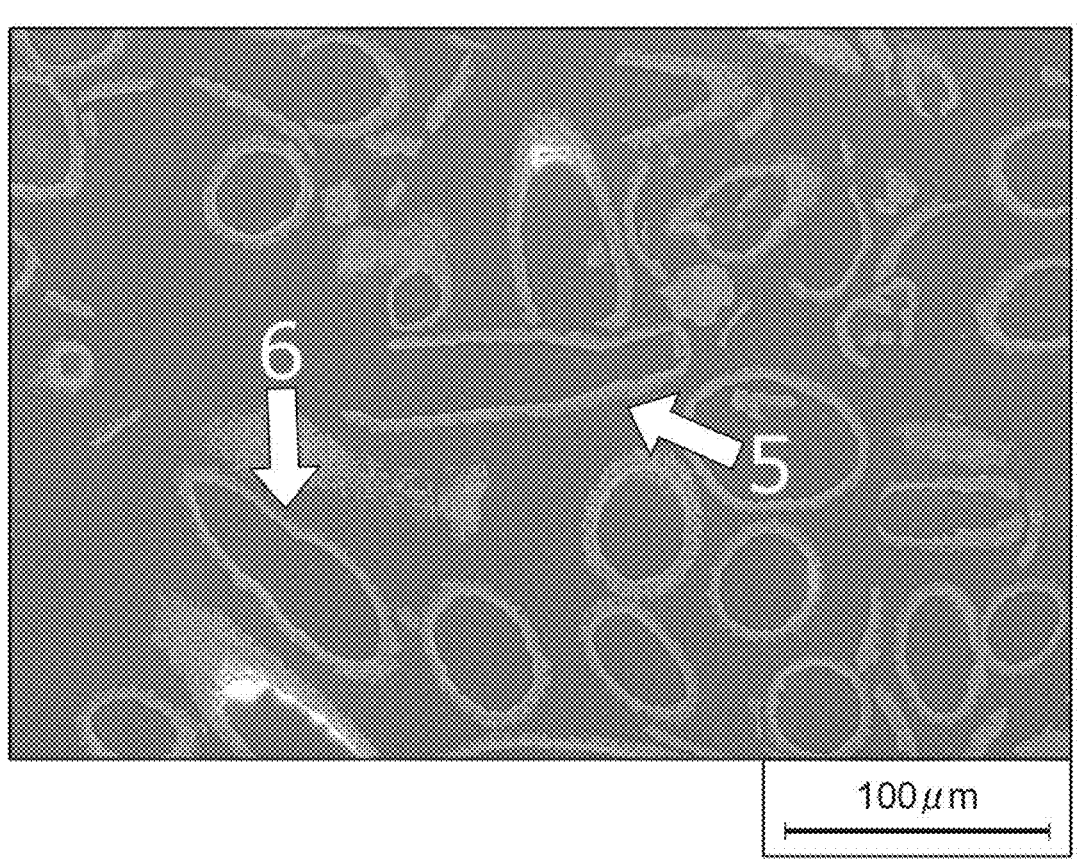
FIG. 4 is a SEM image of a cross section of a sheet of Example 3.

A sheet was produced in the same manner as in Example 1 except that the amount of the boron nitride particles added was changed to 33 parts by mass with respect to 100 parts by mass of the resin. A SEM image of a cross section of the produced sheet is shown in FIG. 4. In the cross section of the sheet, in one of the boron nitride particles (a boron nitride particle indicated by an arrow 5 in FIG. 4), the area proportion of a hollow part in the boron nitride particle was 70%, the thickness of a shell part was 5.2 μm, the aspect ratio was 4.6, and the maximum length was 182 μm. In addition, in the cross section of the sheet, in another of the boron nitride particles (a boron nitride particle indicated by an arrow 6 in FIG. 4), the area proportion of a hollow part in the boron nitride particles was 65%, the thickness of a shell part was 5.9 μm, the aspect ratio was 2.9, and the maximum length was 111 μm. The proportion of the resin in the sheet was 79%, and the proportion of the boron nitride particles was 21%.

Comparative Example 1

A sheet was produced in the same manner as in Example 1 except that the boron nitride particles obtained in Example 1 were changed to massive boron nitride particles having an average particle diameter of 85 μm and the amount of the boron nitride particles added was changed to 47 parts by mass with respect to 100 parts by mass of the resin.

[Measurement of Thermal Conductivity]

A specimen for measurement having sizes of 10 mm×10 mm was cut out from the obtained sheet, and the thermal diffusivity A (m²/second) of the specimen for measurement was measured by a laser flash method in which a xenon flash analyzer (LFA 447 NanoFlash manufactured by NETZSCH Group) was used. In addition, the specific gravity B (kg/m³) of the specimen for measurement was measured by the Archimedes method. In addition, the specific heat capacity C (J/(kg·K)) of the specimen for measurement was measured using a differential scanning calorimeter (Thermo Plus Evo DSC 8230 manufactured by Rigaku Corporation). The thermal conductivity H (W/(m·K)) was obtained by a formula H=A×B×C using each of these physical property values. The measurement results of the thermal conductivity are shown in Table 1.

TABLE 1

| | Thermal conductivity (W/(m · K)) |
| --- | --- |
| Example 1 | 5.9 |
| Example 2 | 4.6 |
| Example 3 | 2.5 |
| Comparative Example 1 | 1.2 |

From Table 1, it is found that, even when the amount of the boron nitride particle having a hollow part added is reduced from 81 parts by mass (Example 1) to 47 parts by mass (Example 2) and further reduced to 33 parts by mass (Example 3), the thermal conductivity is superior to that of the sheet of Comparative Example 1 in which the amount of the massive boron nitride particles having an average particle diameter of 85 μm added is 47 parts by mass, and thus it is possible to reduce the weights of the sheets while maintaining the excellent thermal conductivity of the sheets.

The invention claimed is:

1. A sheet comprising:
   a resin; and
   boron nitride particles each having a hollow part,
   wherein the resin is filled into the hollow part of the boron nitride particles,
   wherein the boron nitride particles have a shell part,
   wherein the boron nitride particles have an elongated shape,
   wherein the boron nitride particles comprise a boron nitride particle having an aspect ratio of 2.0 or more,
   wherein the boron nitride particle having an aspect ratio of 2.0 or more has a maximum length of 150 μm or longer, and
   a thickness of the shell part is 1 μm or more.

2. The sheet according to claim 1,
   wherein the boron nitride particles comprise a boron nitride particle having an area proportion of the hollow part in the boron nitride particle of 40% or more in a cross section of the sheet.

3. The sheet according to claim 1,
   wherein the boron nitride particles comprise a boron nitride particle having an aspect ratio of 3.0 or more.

4. The sheet according to claim 3,
   wherein the boron nitride particle having an aspect ratio of 3.0 or more has a maximum length of 150 μm or longer.

* * * * *